(12) United States Patent
Kuebert et al.

(10) Patent No.: US 8,521,657 B2
(45) Date of Patent: Aug. 27, 2013

(54) SYSTEMS AND METHODS FOR CAPTURING MAIL FOR ELECTRONIC BILL PRESENTMENT

(75) Inventors: Edward J. Kuebert, Warrenton, VA (US); Phillip A. Pensabene, Huntington, MD (US); Maria C. Penn, Alexandria, VA (US); Christine R. L. Ray, Washington, DC (US)

(73) Assignee: United States Postal Service, Washington, DC (US)

( * ) Notice: Subject to any disclaimer, the term of this patent is extended or adjusted under 35 U.S.C. 154(b) by 1035 days.

(21) Appl. No.: 10/416,346

(22) PCT Filed: Apr. 3, 2002

(86) PCT No.: PCT/US02/10308
§ 371 (c)(1), (2), (4) Date: May 12, 2003

(87) PCT Pub. No.: WO02/082212
PCT Pub. Date: Oct. 17, 2002

(65) Prior Publication Data
US 2004/0236584 A1 Nov. 25, 2004

Related U.S. Application Data

(60) Provisional application No. 60/280,737, filed on Apr. 3, 2001.

(51) Int. Cl.
G06Q 30/00 (2012.01)
(52) U.S. Cl.
USPC .......................................... 705/337

(58) Field of Classification Search
USPC .......................................... 705/337
See application file for complete search history.

(56) References Cited

U.S. PATENT DOCUMENTS

| 4,543,082 | A | * | 9/1985 | Stenner .................... 493/216 |
| 4,641,753 | A |   | 2/1987 | Tamada |
| 5,340,968 | A | * | 8/1994 | Watanabe et al. .......... 235/380 |
| 5,460,086 | A | * | 10/1995 | Bernardo et al. .......... 101/93.18 |
| 5,586,036 | A |   | 12/1996 | Pintsov |
| 5,917,925 | A |   | 6/1999 | Moore |
| 6,032,133 | A |   | 2/2000 | Hilt et al. |
| 6,078,907 | A |   | 6/2000 | Lamm |

(Continued)

FOREIGN PATENT DOCUMENTS

| JP | 11-300287 | 11/1999 |
| WO | WO 00/79455 A1 | 12/2000 |

OTHER PUBLICATIONS

Patel, Jeetu, "The Check Isn't in the Mail," Information Week, Mar. 27, 2000, pp. 224 and 234.*

(Continued)

*Primary Examiner* — Nathan Erb
(74) *Attorney, Agent, or Firm* — Finnegan, Henderson, Farabow, Garrett & Dunner, L.L.P.

(57) ABSTRACT

A system and method of identifying a mailpiece (230) in an electronic bill presentment system is provided. The system identifies the mailpiece based on an identification mark. A method of identifying the mailpiece comprises (450) the steps of scanning the mailpiece for the identification mark (940). The system receives registration information (210, 410) from a customer and sorts the mailpiece based on the identification mark (950).

15 Claims, 10 Drawing Sheets

(56) References Cited

U.S. PATENT DOCUMENTS

| | | |
|---|---|---|
| 6,285,991 B1 | 9/2001 | Powar |
| 6,289,323 B1 | 9/2001 | Gordon et al. |
| 6,292,789 B1 | 9/2001 | Schutzer |
| 6,539,098 B1 * | 3/2003 | Baker et al. .................. 382/101 |
| 6,549,892 B1 | 4/2003 | Sansone |
| 6,934,691 B1 * | 8/2005 | Simpson et al. ................ 705/34 |
| 7,265,853 B1 * | 9/2007 | Kara et al. .................. 358/1.15 |
| 2002/0019808 A1 * | 2/2002 | Sharma .......................... 705/40 |
| 2002/0029202 A1 * | 3/2002 | Lopez ........................... 705/406 |
| 2002/0052840 A1 | 5/2002 | Kitchen et al. |
| 2002/0059139 A1 | 5/2002 | Evans |
| 2002/0087469 A1 | 7/2002 | Ganesan et al. |
| 2002/0095306 A1 * | 7/2002 | Smith et al. ....................... 705/1 |

OTHER PUBLICATIONS

"The Future of Snail Mail," Information Week, p. 34+, Dec. 4, 1995, Business & Industry(R), 2004, The Gale Group.

* cited by examiner

SYSTEMS AND METHODS FOR CAPTURING MAIL FOR ELECTRONIC BILL PRESENTMENT

CROSS-REFERENCE TO RELATED APPLICATIONS

This application is based upon and claims the benefit of priority from U.S. Provisional Application No. 60/280,737 by Edward J. Kuebert et al., filed Apr. 3, 2001, the contents of which are expressly incorporated herein by reference.

TECHNICAL FIELD

The present invention deals with electronic bill presentment.

BACKGROUND

Currently, a customer receives bills from a biller through standard mail systems. Examples of billers include credit card companies, utilities, banks, and other entities for which a customer receives a service which requires billing. The customer receives a bill, usually monthly, from the biller and remits payment to the biller through the mail system. Each customer needs to spend a significant amount of time each month to respond to the various bills. The most common method of bill payment is to write paper checks for the appropriate amounts and mail such checks to the biller. This method is labor intensive and time consuming for the customer, and must be done on multiple occasions each month since the bills do not normally arrive or become due on the same date.

Figure 1:
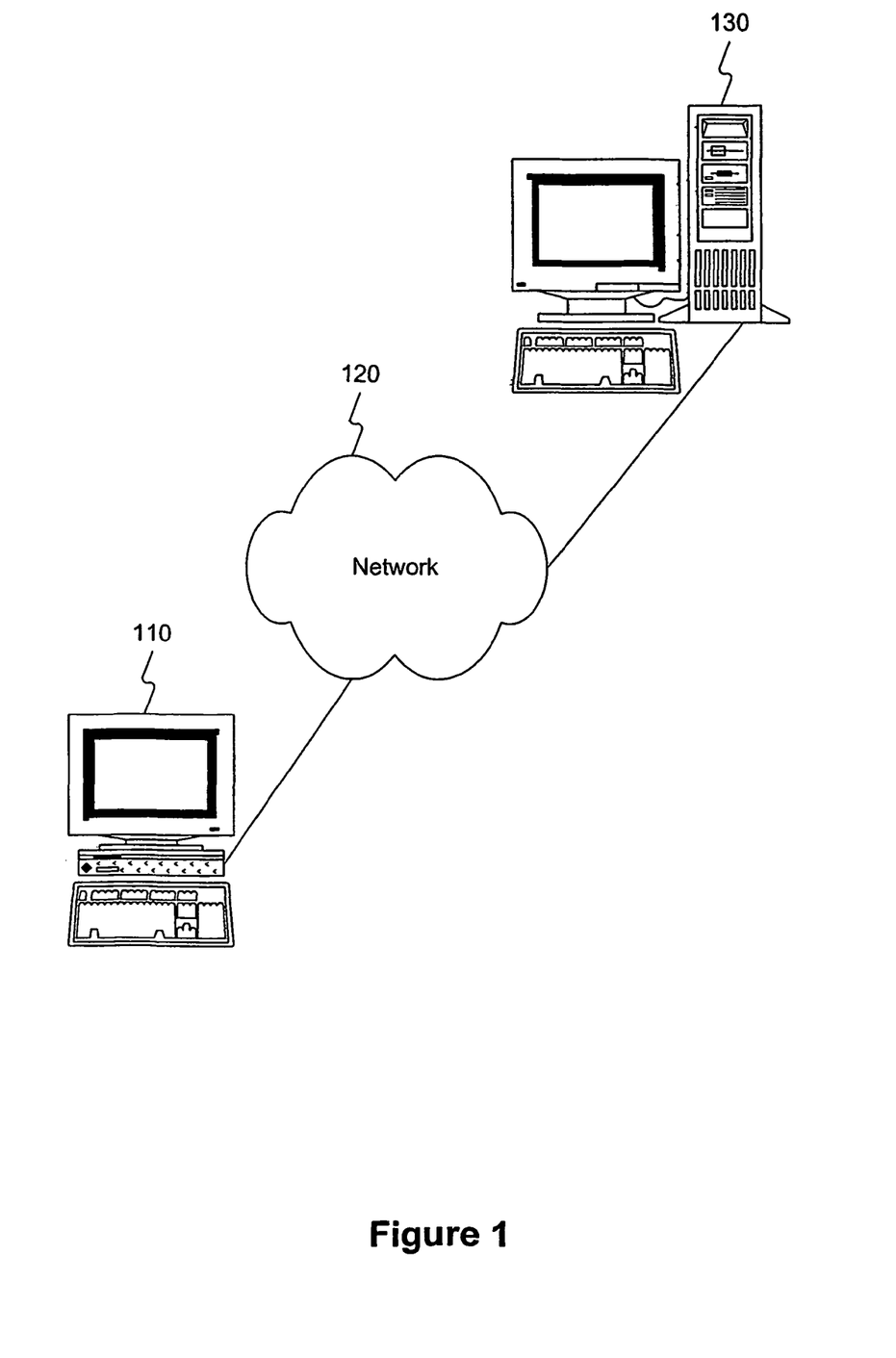
FIG. 1 is a diagram of a conventional electronic bill presentment system.

Electronic bill presentment is a process for providing a customer with a bill electronically. Electronic bill presentment permits a customer to view and pay their bills electronically, for example, over the Internet. FIG. 1 illustrates a conventional electronic bill presentment system. In this system, a customer, located at terminal 110, wishes to pay bills electronically. Terminal 110 may be, for example, a personal computer connected to network 120. The customer registers with a biller located at biller terminal 130. The registration may comprise, for example, transmitting, to the biller terminal, customer information such as customer name and account information. Once the biller terminal receives and verifies the customer information, the biller will transmit the customer's bill by the electronic bill presentment methods. For example, the biller may transmit the bill to the customer via email each month. This is achieved by transmitting the email from biller terminal 130 through network 120 to customer terminal 110. Once the customer receives the email containing the bill, the customer may pay the bill by conventional mail or electronic means.

Some billers currently offer this service, but if a customer wants to have bills of different biller presented electronically, the customer must register with each biller separately. However, a customer may want to view and pay all of their bills in a single location, rather than registering with each biller. Additionally, not all billers presently have the ability to implement electronic bill presentation methodology. Further, even billers that implement electronic bill presentation often still send bills by mail in addition to electronically.

SUMMARY OF THE INVENTION

In accordance with the invention, there is provided a bill presentation method and system. The present invention involves several aspects which include a variety of different levels of biller interaction. One aspect is directed to a bill presentation method and system in which the customer is directly involved with the intermediary but requires no interaction with the biller. Another aspect is directed to a bill presentation in which the biller and the customer are directly involved with the intermediary.

Additional advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate aspects consistent with the present invention and together with the description, serve to explain the principles of the invention.

DESCRIPTION OF THE EMBODIMENTS

Reference will now be made in detail to aspects consistent with the present invention, examples of which are illustrated in the accompanying drawings. Wherever possible, the same reference numbers will be used throughout the drawings to refer to the same or like parts.

The present invention is directed to a bill presentation method and system which serves improve on conventional bill presentation systems and methods. The disclosed system works by a intermediary intercepting correspondence which is intended for customers. The intermediary may be a department of a mail service provider or a separate commercial entity. The intermediary determines if any of the correspondence consists of bills related to a certain customer, removes the bills from other correspondence, and flags the bills for electronic bill presentment. The disclosed system involves several aspects which include a variety of different levels of biller interaction. One aspect is directed to a bill presentation method and system in which the customer is directly involved with the intermediary but requires no interaction with the biller. Another aspect is directed to a bill presentation in which the biller and the customer are directly involved with the intermediary.

A first aspect is directed to a bill presentation method and system in which the customer is directly involved with the intermediary but requires no interaction with the biller. In this aspect, the customer would deal directly with the intermediary and would have no additional interaction with the biller.

Figure 2:
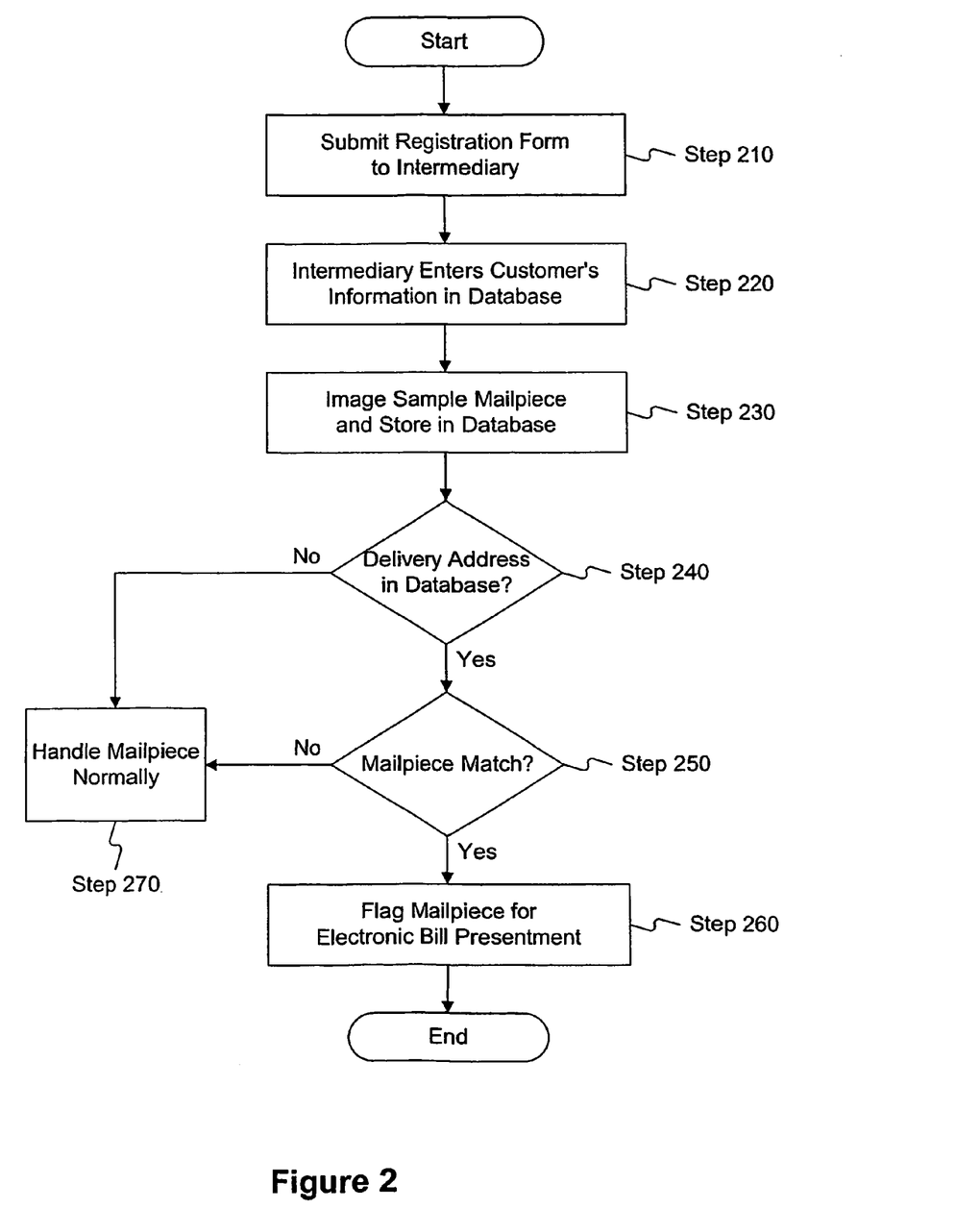
FIG. 2 is a flow chart illustrating a bill presentment method according to a first aspect consistent with the present invention.

FIG. 2 is a flow chart illustrating a method of capturing mail for electronic bill presentment according to the first aspect consistent with the present invention. The process begins by the customer submitting a registration form to the intermediary including customer identification information and biller information. The biller information may be in the form of sample mailpieces used by the biller to send the bills (step 210). The customer identification information may contain standard information, such as customer name, customer address, customer personal information, email address, types of bills for electronic presentment, and method of electronic presentment. One skilled in the art would realize the form may contain other data used to identify and describe the customer. The form may be a standard paper form which may be forwarded to the intermediary by standard mail systems or the form may be an electronic form submitted to the intermediary by electronic means, such as electronic mail.

Next, the intermediary would enter that customer's information into a database maintained by the intermediary (step 220). The database may be a standard database, such as a database stored on a computer. Next, the intermediary images the sample mailpiece for a particular biller which was provided by the customer and stores the imaged mailpiece in the database (step 230).

Then, when a mailpiece is received by the intermediary, the intermediary processes the mailpiece and determines the delivery address of the mailpiece (step 240). If that mailpiece is addressed to a customer which has information stored in the database, the intermediary performs form recognition or optical character recognition (OCR) of the mailpiece (step 250). If the mailpiece is not addressed to a customer with information stored in the database, the mailpiece is processed normally (step 270).

If the mailpiece is determined to match a biller's sample mailpiece stored in the database, the mailpiece is a bill designated by the customer for electronic bill presentation. Thus, that mailpiece is flagged for electronic bill presentment (step 260). This may involve sorting the mailpiece into a special bin for expedited delivery to a bill presentment center or may involve redirecting the mailpiece to the normal bin that includes delivery to a bill presentment center. Then, the flagged mailpiece is delivered to the bill presentment center.

Figure 3:
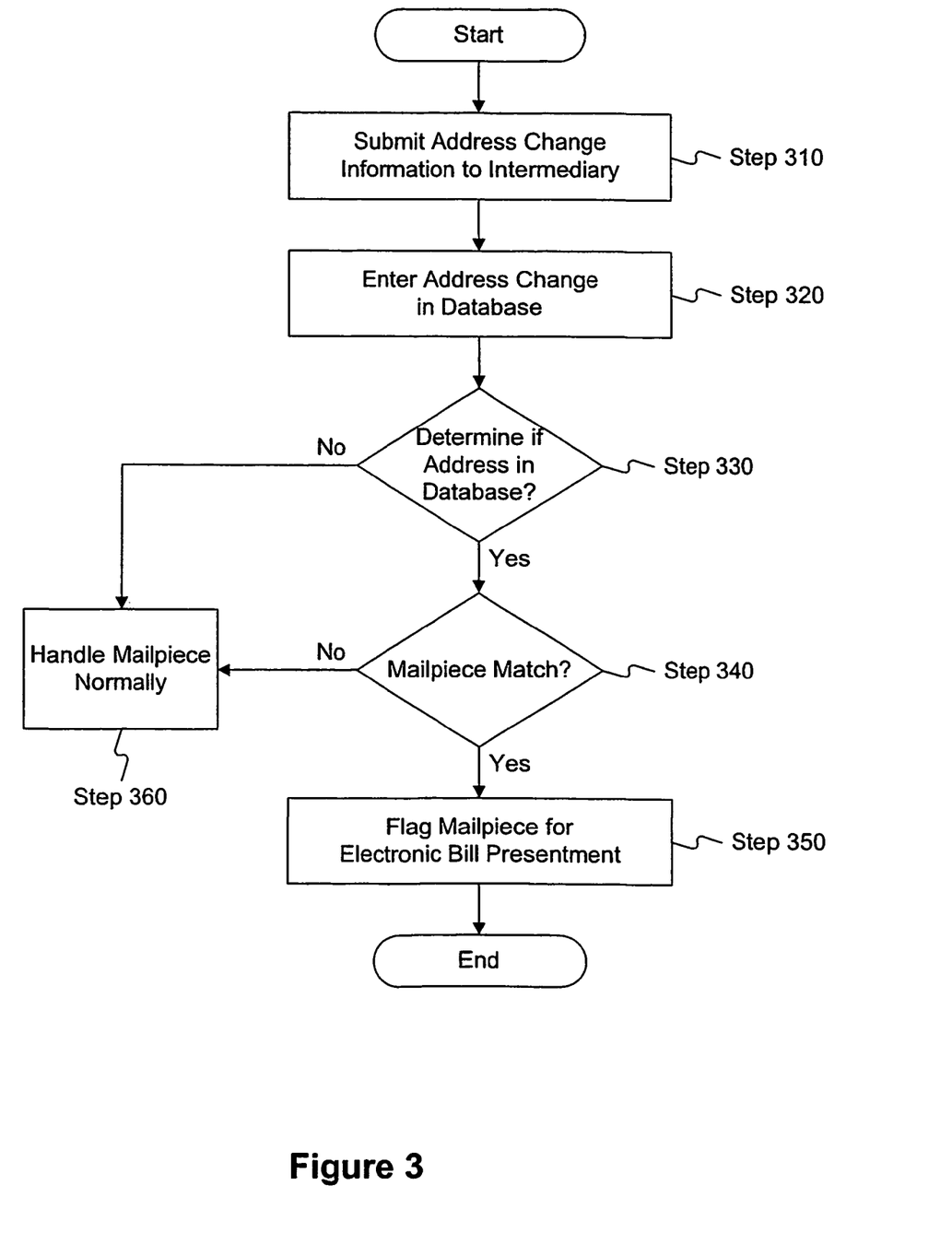
FIGS. 3 and 4 are flow charts illustrating a bill presentment method according to variations in the first aspect consistent with the present invention.

FIG. 3 is a flow chart illustrating the steps involved in a variation of the first aspect. In this case, the customer has already established service with the intermediary and is now changing addresses. The customer changes delivery address for specific mailpiece by submitting a change of address form to the intermediary and biller (step 310). The biller would not necessarily know whether the customer has moved to this new location or not. All the biller knows is, instead of the customer receiving mail at one address, the customer receives it at another address. The intermediary updates the database by entering the customer's change of address (step 320).

The rest of the steps work the same as the method described in FIG. 2. That is, when a mailpiece is received by the intermediary, the intermediary processes the mailpiece and determines the delivery address of the mailpiece (step 330). If that mailpiece is addressed to a customer which has information stored in the database, the intermediary performs form recognition or optical character recognition (OCR) of the mailpiece (step 340). If the mailpiece is not addressed to a customer with information stored in the database, the mailpiece is processed normally (step 360).

If the mailpiece is determined to match a biller's sample mailpiece stored in the database, the mailpiece is a bill designated by the customer for electronic bill presentation. Thus, that mailpiece is flagged for electronic bill presentment (step 350). This may involve sorting the mailpiece into a special bin for expedited delivery to a bill presentment center or may involve redirecting the mailpiece to the normal bin that includes delivery to a bill presentment center. Then, the flagged mailpiece is delivered to the bill presentment center.

Figure 4:
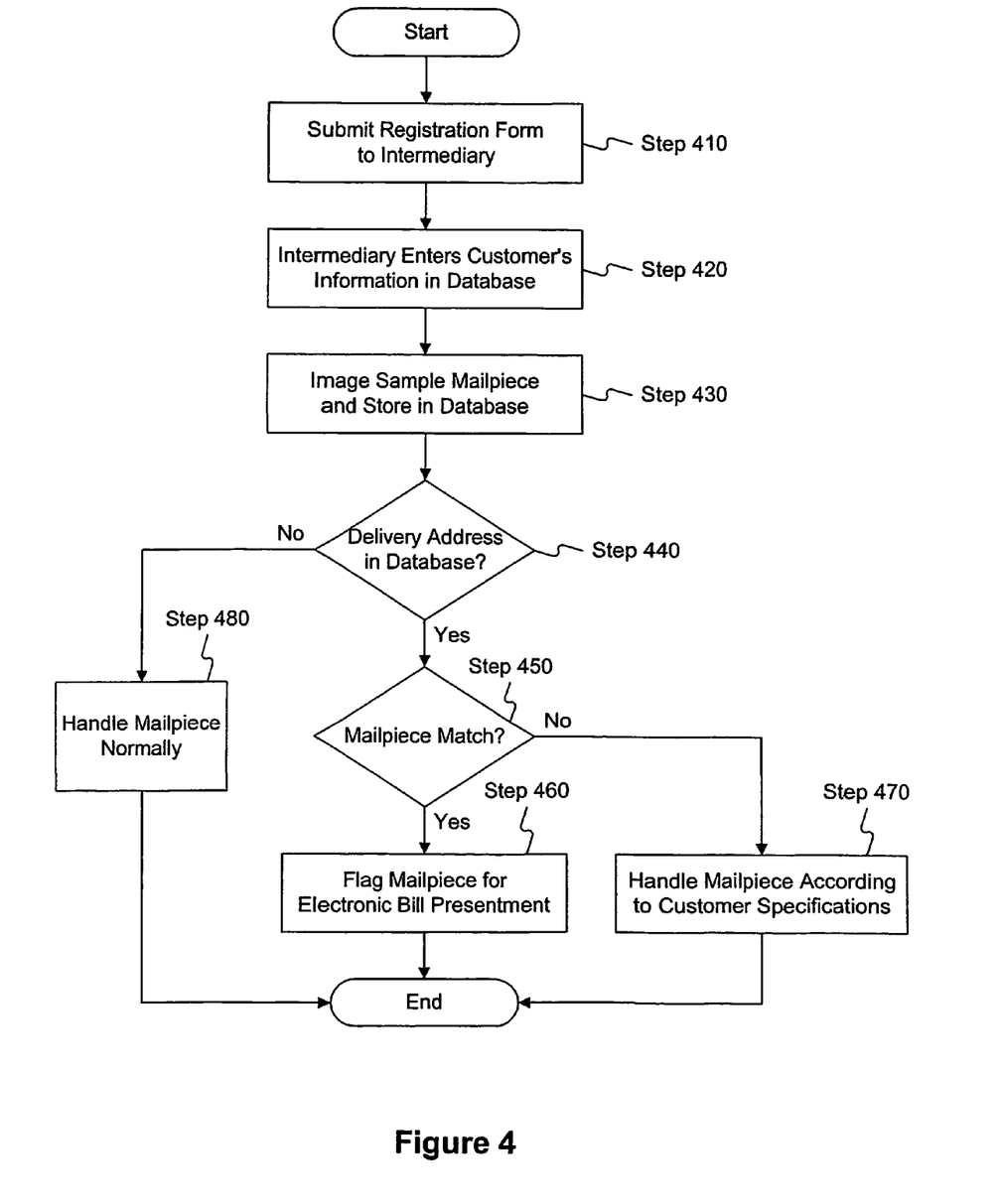

FIG. 4 is a flow chart illustrating another variation of the first aspect. In this case, the customer would specify all mail to be redirected, not just bills from billers. This method is similar to the method illustrated in FIG. 2. The process begins by the customer submitting a registration form to the intermediary, along with sample mailpieces used by the biller to send the bills (step 410). The form would contain standard information, such as customer name, customer address, customer personal information, email address, types of bills for electronic presentation, and method of electronic presentation. One skilled in the art would realize the form may contain other data used to identify and describe the customer. Plus, in this variation, the form would include instructions for dealing with mail which is not mail flagged for electronic bill presentment. The form may be a standard paper form which may be forwarded to the intermediary, or the form may be an electronic form submitted to the intermediary by electronic means, such as email.

Next, the intermediary would enter that customer's information into a database maintained by the intermediary (step 420). The database may be a standard database, such as a database stored on a computer. Next, the intermediary images the sample mailpiece for a particular biller which was provided by the customer and stores the imaged mailpiece in the database (step 430).

Then, when a mailpiece arrives, the intermediary processes the mailpiece and determines the delivery address of the mailpiece (step 440). If that mailpiece matches any information contained in the database, the intermediary performs form recognition or optical character recognition (OCR) of the mailpiece (step 450). If the mailpiece is not addressed to a customer with information stored in the database, the mailpiece is processed normally (step 480).

If the mailpiece is determined to match the imaged sample mailpiece contained in the database in step 440, the mailpiece is a bill designated by the customer for electronic bill presentation. Thus, that mailpiece is flagged for electronic bill presentment (step 460). This may involve sorting the mailpiece into a special bin for expedited delivery to a bill presentment center or may involve redirecting the mailpiece to the normal bin that includes delivery to a bill presentment center. Then, the flagged mailpiece is delivered to the bill presentment center. Additionally, if the mailpiece does not match the imaged sample mailpiece stored in the database, the mailpiece is flagged to be dealt with as specified by the customer (step 470).

This aspect functions like a mail concierge service. A customer can specify to the intermediary how to deal with all mail addressed to the customer.

A second aspect consistent with the present invention involves both the customer and the biller. In this aspect, the customer and the biller, when the customer opts in, use specially marked or encoded mailpieces or address inserts to identify mailpieces to be captured during processing. For example, the marked or encoded mailpieces may include facing identification marks (FIM) marks, POSTNET codes or PLANET™ codes (special bar codes), information based indicia (IBI) marks, or any other recognition marks for OCR pick up or other identification means, such as remote bar codes (RBCs) or a semi-visible barcode on back, or radio frequency ID (RFID) tags. The FIMs, PLANET™ codes, IBIP or other recognition marks may be on the mailpieces or on the insert (e.g., in a window-type mailpiece situation), and may exist jointly or singly. When the mailpiece is received by the intermediary, upon scanning the mark identifying the mailpiece as a piece involved in a bill presentment, that mailpiece would be captured for electronic bill presentment. However, in this aspect, if the identifying mark is present, it is not required that the mailpiece be scanned to determine if it matches a sample mailpiece. Whatever the identification mark, the mark would identify the participating customer and it may also have information identifying redirected mailpiece.

Figure 5:
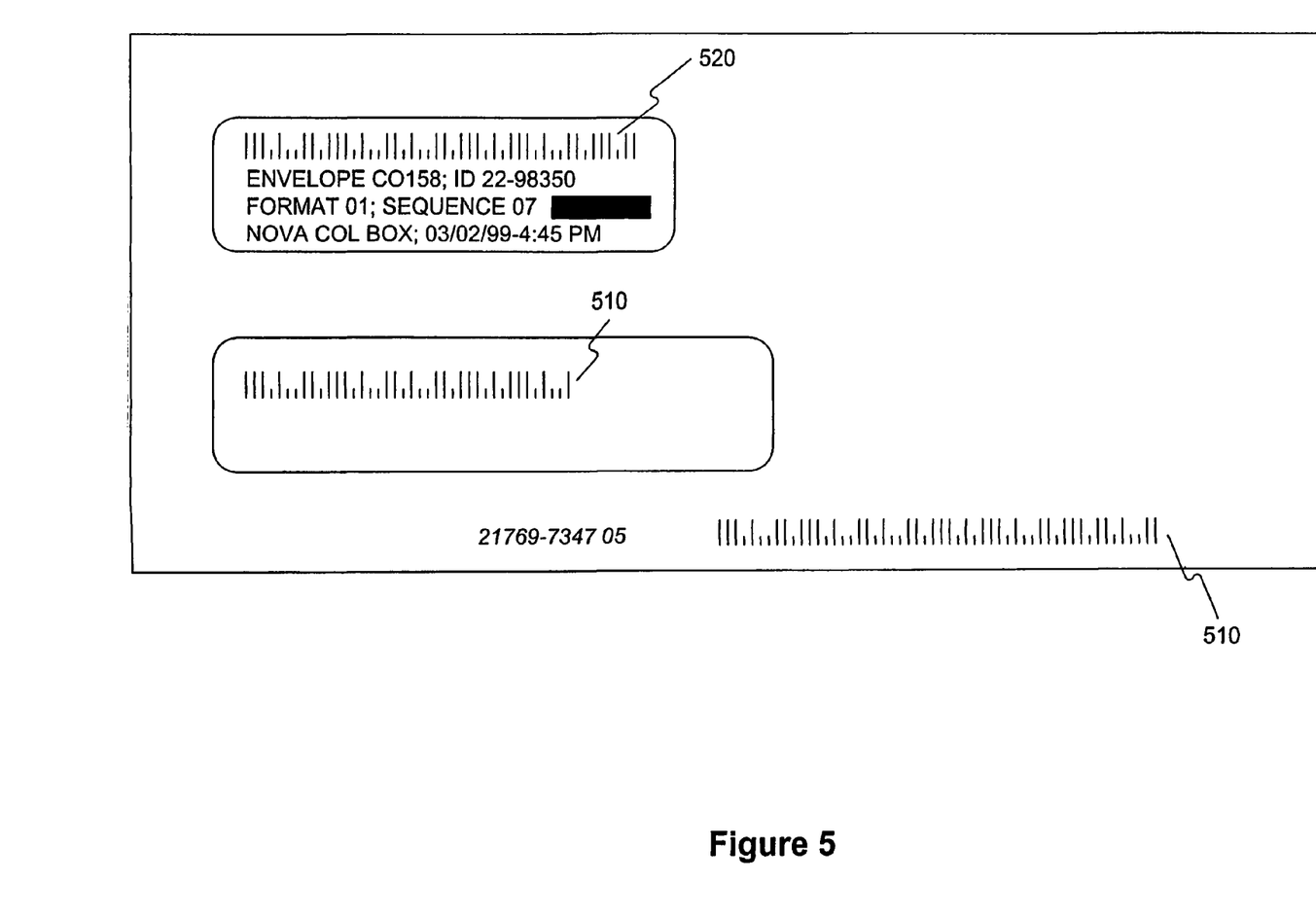
FIGS. 5-8 are examples of different types of facing identification marks according to certain aspects consistent with the present invention.

FIG. 5 illustrates both PLANET™ and POSTNET codes, types of barcodes currently used by the United States Postal Service. In this example, a POSTNET code 510 is located both in the delivery address window, and at the bottom of the mailpiece. A PLANET™ code 520 is located in the return address window, in this example. A POSTNET code contains the numerical information that is normally equivalent to a delivery point or delivery address. The PLANET™ code contains an identification mark equating to the 2 digit identification mark which describes the type of information contained in that PLANET™ code.

Figure 6:
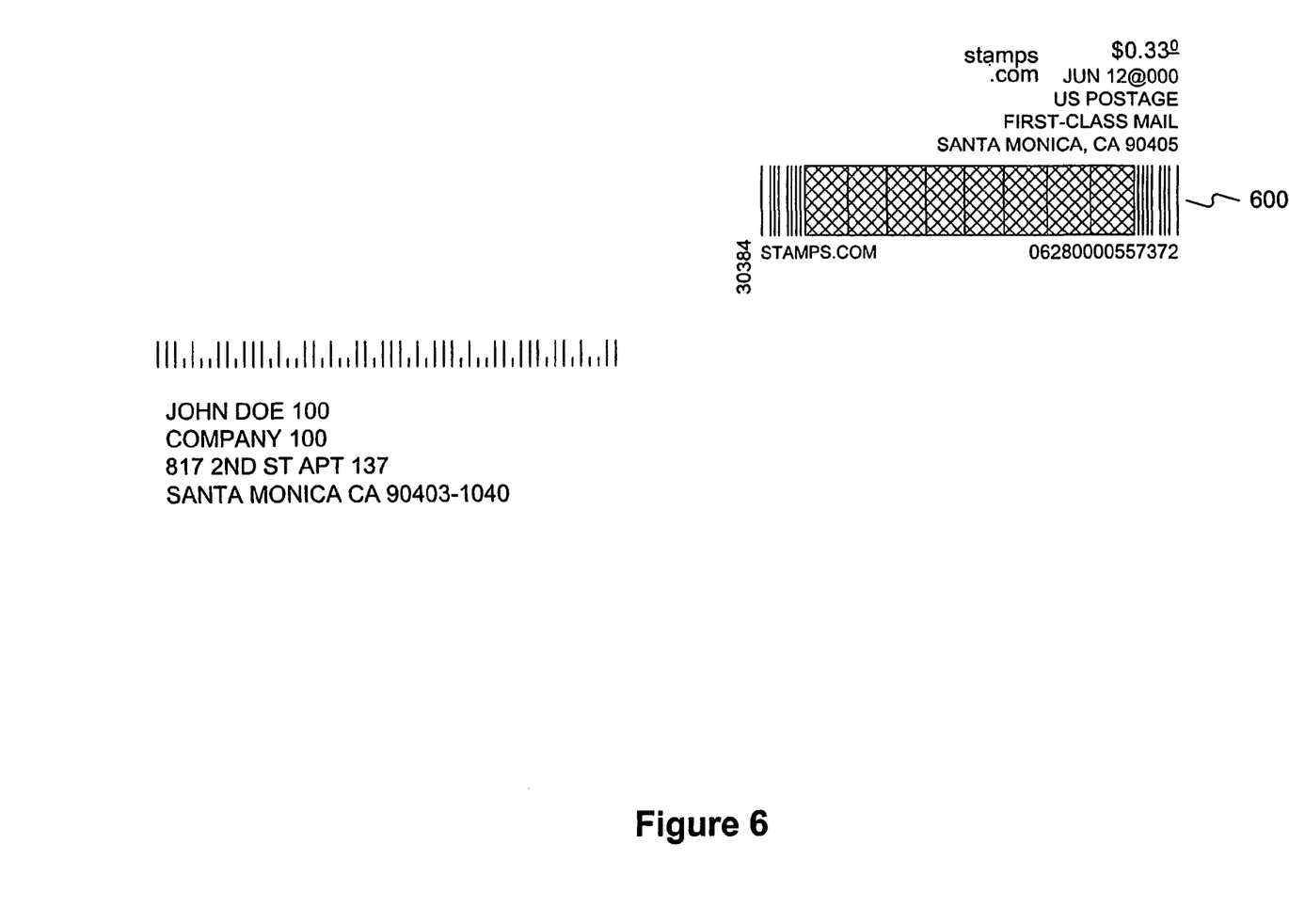
Figure 7:
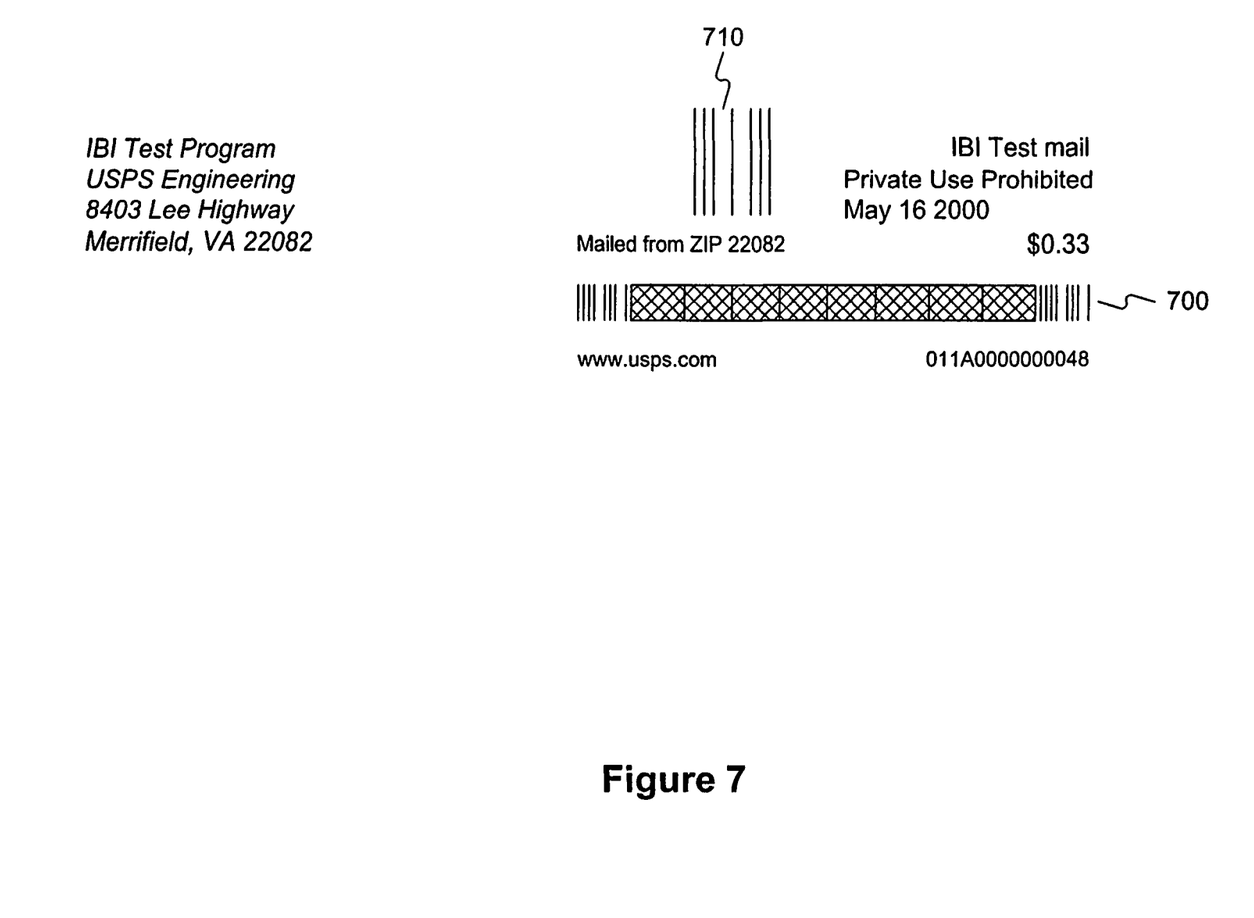
Figure 8:
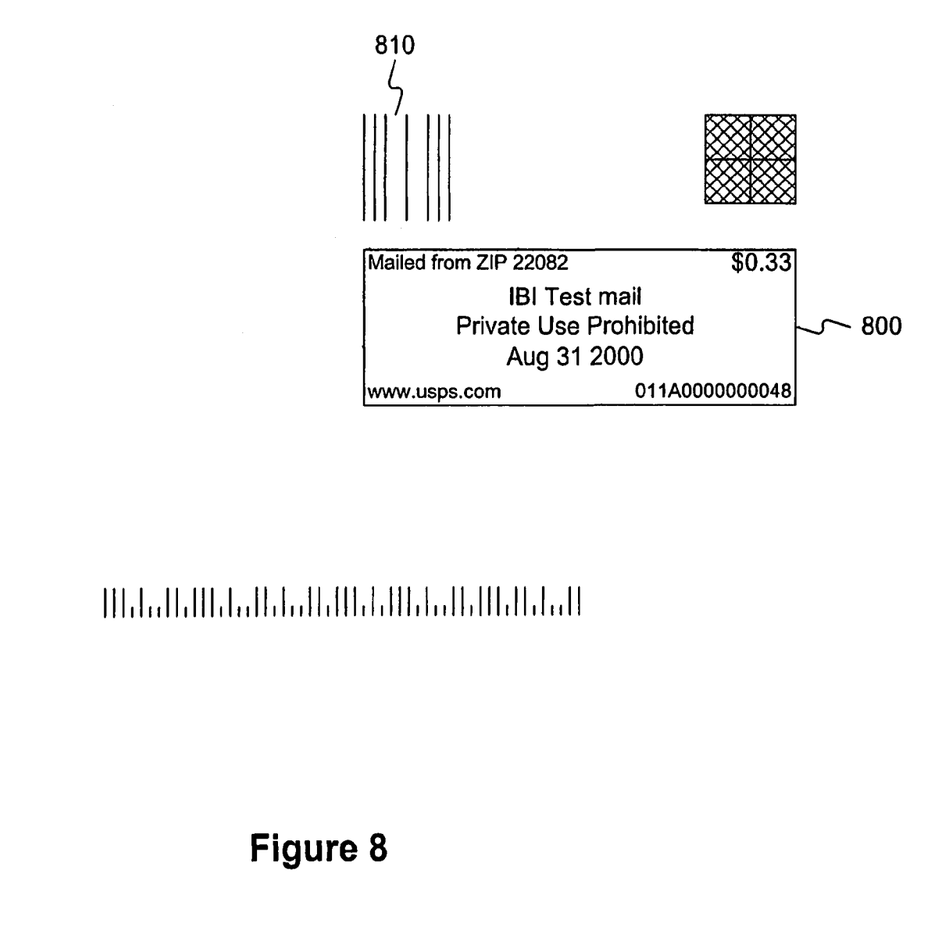

IBI markings are computer readable indicia that may store various information, such as whether a mailpiece is designated for electronic bill presentment, to whom the mailpiece should be redirected, and other delivery or customer information. FIGS. 6-8 illustrate various types of IBI markings (see, for example, reference numerals 600, 700, and 800).

Other types of codes or markings include RFID and RBC. The RFID is a tag imprinted into the mailpiece that is read by a radio frequency reader. The RFID emits a radio frequency signal which is read by the radio frequency reader. An RBC is a fluorescent bar code normally printed on the back of the mailpiece.

Figure 9:
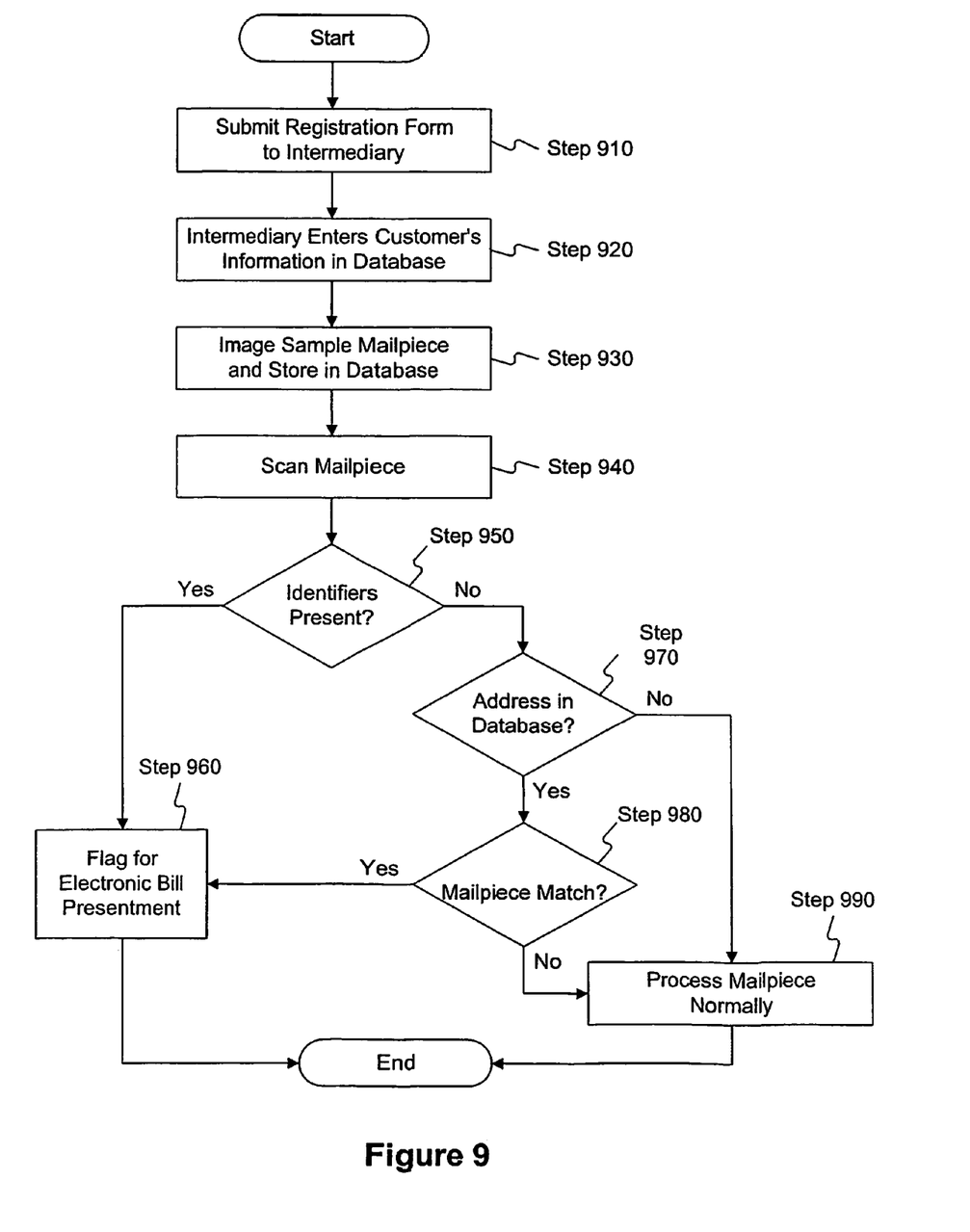
FIG. 9 is a flow chart illustrating a bill presentment method according to a second aspect consistent with the present invention.

FIG. 9 is a flow chart illustrating a method of capturing mail for electronic bill presentment according to a second aspect. The method begins by the customer submitting a registration form to the intermediary along with sample mailpieces used to send the bill from a particular biller (step 910). The form may contain standard information, such as customer name, customer address, customer personal information, email address, types of bills for electronic presentation, and method of electronic presentation. One skilled in the art would realize the form may contain other data used to identify and describe the customer. Plus, the form may include instructions for dealing with mailpieces which is not mailpieces for electronic bill presentment. The form may be a standard paper form which would be forwarded to the intermediary or the form may be an electronic form submitted to the intermediary by electronic means.

Next, the intermediary enters that customer's information into a database maintained by the intermediary (step 920). The database may be a standard database, such as a database stored on a computer. Next, the intermediary images the sample mailpiece for a particular biller which was provided by the customer and stores the imaged sample mailpiece in the database (step 930).

Then, the mailpiece is scanned (step 940) for special identifying marks. If there are no identification marks, the delivery address of the mailpiece is determined (step 970). If it is determined that special identification marks are present, such as POSTNET codes, PLANET™ codes, or RFID (step 950), the mailpiece is flagged for electronic bill presentment (step 960). This may involve sorting the mailpiece into a special bin for expedited delivery to a bill presentment center or may involve redirecting the mailpiece to the normal bin that includes delivery to a bill presentment center. Then, the flagged mailpiece is delivered to the bill presentment center.

If, however, the piece does not have a special identification mark, the intermediary determines if the scanned delivery address is in a database (step 970). If not, the mailpiece is processed normally (step 990). If the delivery address does match, an image of the mailpiece is obtained, and a comparison is made between the mailpiece image and the image of the sample mailpiece stored in the database (step 980). If there is a match (e.g., the mailpiece is a bill), the mailpiece is processed and flagged for electronic bill presentment (step 960); otherwise, the mailpiece is processed normally (step 990).

One variation of the second aspect may allow an mailpiece with one human readable address, plus an identification mark to direct the mailpiece to a different address, such as the bill presentment center. This allows completely automatic mailpiece processing because the bill is directly addressed to the bill presentment center.

In both aspects, the bill presentment center is located remotely (or is subcontracted) from the system identifying the bills. Once mailpiece identified as a bill has been flagged and sorted, this mailpiece is transferred to the bill presentment center. Alternatively, the bill presentment center may be located in the same place a the system identifying the bills. This alternative requires identifying the mailpiece locally, keeping the mail locally, and preparing the bills for electronic bill presentment.

As for bill presentment, once a mailpiece containing a recognition mark is flagged, or alternatively, when an mailpiece has been recognized, the mailpiece is sorted. Conceivably, at that point, there are several different methods by which the flagged mailpieces may be dealt with. One option is that any of the flagged pieces of mailpieces identified as requiring forwarding to a bill presentment center may be packaged up and physically delivered by express delivery service to the bill presentment center. This is an expedited sortation and delivery method, which would permit the mailpiece to get more quickly to the bill presentment center and allow faster electronic bill presentment. In the intercepting and expedited service, which is only an option for electronic bill presentment, both the biller and the customer would have quicker accessibility to the funds or to the payment opportunity.

Another option is for the mailpiece to be sent to the bill presentment center by normal means, that is, placed in the normal mailstream for normal processing. This option is slower than the first option, but less expensive.

Figure 10:
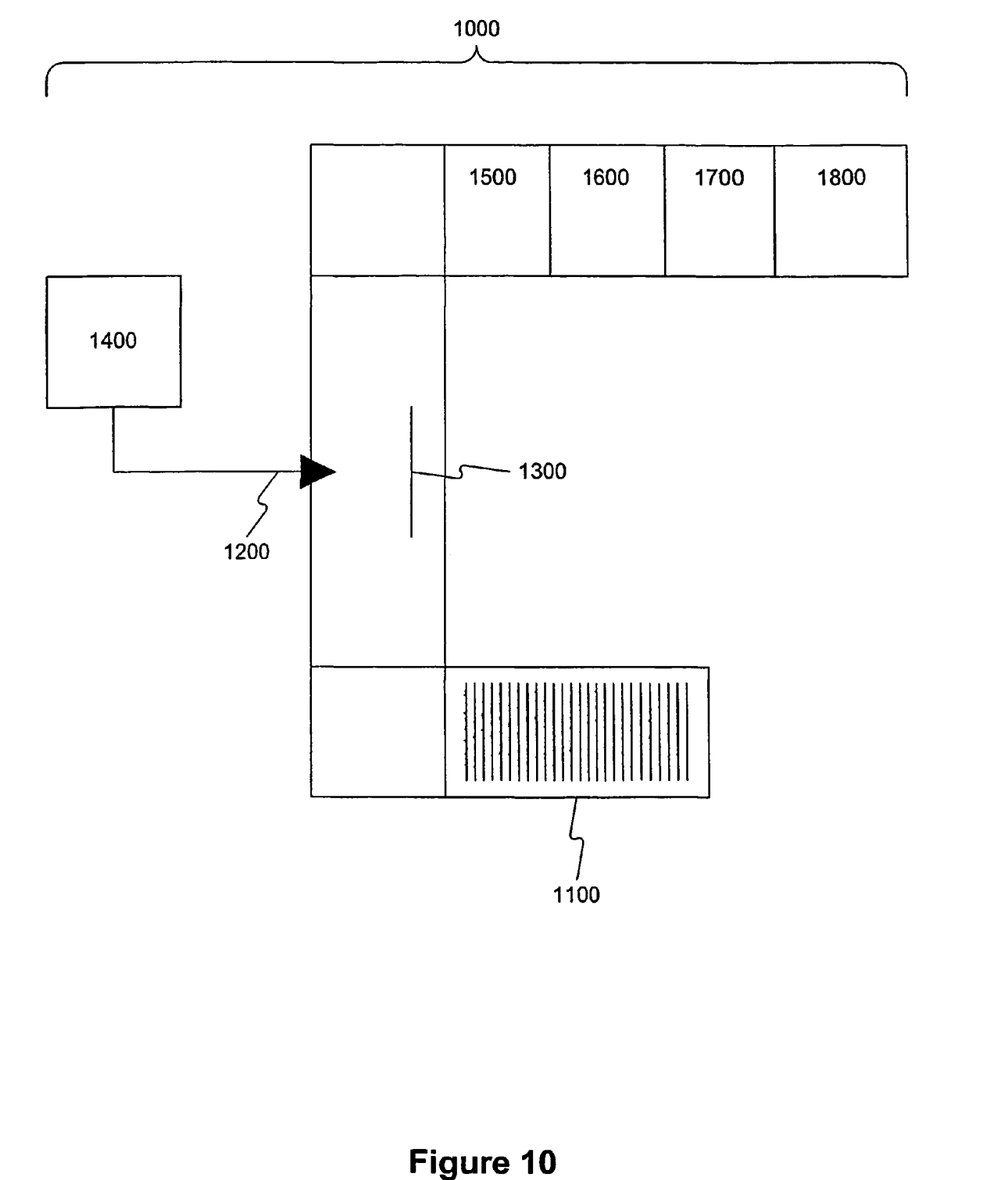
FIG. 10 is a diagram of a system for performing different aspects of the present invention.

FIG. 10 illustrates a system 1000 located at the intermediary for performing electronic bill presentment determination related to the present invention. The system may function to perform any aspect consistent with the present invention. In system 1000, mail is received by the intermediary and stacked in bin 1100 to await processing. The mail may be stacked in bin 1100 by a human or automated means. One by one, each mailpiece, for example, mailpiece 1300, is forwarded through the system and passed by scanning system 1200. Scanning system 1200 includes, for example, an optical character recognition (OCR) system, a bar code reader, a camera, a radio frequency reader, or any combination thereof. For example, in the second aspect in which PLANET codes are utilized, scanning system 1200 would include a bar code reader for reading the PLANET code, an OCR system for determining the delivery address, and a camera for imaging the mailpiece 1300.

As mailpiece 1300 passes in front of scanning system 1200, information from the scanning system 1200 is sent to a processing unit 1400, which determines if mailpiece 1300 includes an identification mark. Based on the determination of processing unit 1400, and sorting algorithms that are stored in the processing unit 1400, mailpiece 1300 is sent to one of a number of sorting bins, such as 1500-1800. For example, if mailpiece 130 includes an identification mark or the delivery address and mailpiece match stored samples indicating that the mailpiece is for electronic bill presentment, processing unit 1400 may sort the mailpiece 1300 into bin 1500. From this bin, mailpiece 1300 may be redirected to an electronic bill presentment center, either through normal processing channels or through an expedited system, as described above.

Processing unit 1400 may be, for example, a computer unit. In this case, processing unit 1400 may contain standard components for inputting, outputting, manipulating, and storing data. For example, processing unit 1400 may comprise a central processing unit (CPU), random access bin, mailpiece 1300 may be redirected to an electronic bill presentment center, either through normal processing channels or through an expedited system, as described above.

Processing unit 1400 may be, for example, a computer unit. In this case, processing unit 1400 may contain standard components for inputting, outputting, manipulating, and storing data. For example, processing unit 1400 may comprise a central processing unit (CPU), random access memory (RAM), video card, sound card, magnetic storage devices, optical storage devices, input/output (I/O) terminals, and a network interface card (NIC) (all not shown). Computer unit 1412 may optionally be connected to a printer (not shown) through the I/O terminals. Examples of the I/O terminals to which the printer may be connected are parallel, serial, universal serial bus, and IEEE 1394.

Also, processing unit 1400 may be connected to the other computing units through a network (not shown). For example, the network may be a local area network (LAN) or wide area network (WAN), such as the Internet, or wireless network.

Processing unit 1400 is configured to store customer information, retrieve customer information, scan mailpieces for delivery address and identification marks, match mailpieces, and control scanning system 1300. The process may be configured in the form of a process created using various programming languages or software suites. For example, the delivery address matching may be a program written in the Java™ programming language, hypertext markup language, or C programming language. Processing unit 1400 also contains a database for storing customer information and imaged mailpieces. The database may be, for example, a commercially available database or a customized version, programmed in one of the above mentioned computer languages.

In the above methods and systems, the intermediary must be able to intercept the bills transmitted from the biller to the customer. The most advantageous example of an intermediary would be a department of a mail service provider, such as the United States Postal Service. In such an example, the service provider would have direct access to the correspondence, i.e., mail transmitted from the biller to the customer. In this case, the biller could send the bill to the customer as normal mail. The customer may register for electronic bill presentment with the mail service provider by providing customer information, such as a delivery address and sample envelope and bill. The mail service provider would then determine if mailpiece was to be flagged for electronic bill presentment during the normal course of mail processing and forward the flagged mail to a electronic bill presentment center.

For instance, the mail service provider receives mail at a post office. The mail is routed through a standard sorting machine, such as a Flat Sorting Machine. The sorting machine may be adapted to compare received mail to the delivery address and envelopes stored in a database as described in the first aspect of the present invention. Likewise, the sorting machine may be adapted to scan for facing identification marks and delivery addresses as described in the second aspect consistent with the present invention. The mail is then sorted depending on whether an identification mark is present or if the address and scanned envelope are stored in the database.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for sorting for electronic bill presentment, comprising:
   receiving registration information from a customer including customer identification information and biller information, wherein the biller information comprises a sample mailpiece of a biller and the customer identification information comprises the customer's address;
   assigning an identification code to the customer that identifies an item for electronic bill presentment;
   storing the registration information and the associated biller information in a database;
   imaging the sample mailpiece of the biller;
   storing the image of the sample mailpiece as one of a plurality of images of sample mailpieces in the database;
   intercepting a mailpiece addressed to the customer on route to the customer from the biller;
   determining, by a computer, that the mailpiece does not include the identification code;
   determining, by the computer, that an address on the mailpiece matches the customer's address;
   determining, by the computer, that an image of the mailpiece matches any one of the plurality of images of sample mailpieces stored in the database; and
   sorting, by the computer, the mailpiece for electronic bill presentment.

2. The method of claim 1, wherein determining that the mailpiece does not include the identification code comprises:
   scanning the mailpiece for the identification code.

3. The method of claim 2, wherein the identification code includes at least one of a PLANET CODE™, a POSTNET code, a radio frequency identification tag, an information based indicia marking, and a bar code.

4. The method of claim 1, further comprising:
   imaging the mailpiece.

5. The method according to claim 1, wherein the registration information comprises instructions for handling mail that does not have the identification code.

6. The method of claim 1, wherein sorting the mailpiece for the electronic bill presentment further comprises sorting the mailpiece into a special bin for expedited delivery or redirecting the mailpiece to a normal bin.

7. A system for sorting for electronic bill presentment, comprising:

means for receiving registration information from a customer including customer identification information and biller information, wherein the biller information comprises a sample mailpiece of a biller and the customer identification information comprises the customer's address;

means for assigning an identification code to the customer that identifies an item for electronic bill presentment;

means for storing the registration information and the associated biller information in a database;

means for imaging the sample mailpiece of the biller;

means for storing the image of the sample mailpiece as one of a plurality of images of sample mailpieces in the database;

means for intercepting a mailpiece addressed to the customer on route to the customer from the biller;

means for determining whether the mailpiece includes the identification code associated with the stored biller information;

means for sorting the mailpiece for electronic bill presentment when the mailpiece includes the identification code;

means for determining, when the mailpiece does not include the identification code, whether an address on the mailpiece matches the customer's address and, when the address on the mailpiece matches the customer's address, whether an image of the mailpiece matches any one of a plurality of the images of sample mailpieces stored in the database;

means for sorting, when the mailpiece does not include the identification code, the mailpiece for electronic bill presentment when the address on the mailpiece matches the customer's address and the mailpiece matches one of the plurality of images of sample mailpieces; and means for sorting, when the mailpiece does not include the identification code, the mailpiece for normal mail handling when the address on the mailpiece does not match the customer's address or the mailpiece does not match any one of the plurality of images of sample mailpieces.

8. The system of claim 7, further comprising:
means for scanning the mailpiece for the identification code.

9. The system of claim 7, wherein the identification code includes one or more of a PLANET CODE™, a POSTNET code, a radio frequency identification tag, an information based indicia marking, and a bar code.

10. The system of claim 7, further comprising:
means for imaging the mailpiece.

11. The system of claim 7, wherein the means for sorting the mailpiece for the electronic bill presentment further comprises means for sorting the mailpiece into a special bin for expedited delivery or redirecting the mailpiece to a normal bin.

12. A system for sorting for electronic bill presentment, comprising:
a first bin configured to intercept a mailpiece addressed to a customer on route to the customer from the biller;
a scanner configured to scan the mailpiece for an identification code that is assigned to the customer, identify an item for electronic bill presentment, and scan the mailpiece for a recipient address;
a database configured to store a plurality of images of sample mailpieces;
a processor configured to perform the steps comprising:
receiving registration information from the customer comprising customer identification information and biller information for electronic bill payment, wherein the biller information comprises a sample mailpiece of the biller and the customer identification information comprises the customer's address,
storing an image of the sample mailpiece as one of the plurality of images of sample mailpieces in the database,
determining whether the mailpiece includes the scanned identification code, and
when the mailpiece does not include the identification code, determining whether the recipient address matches the customer's address and, when the recipient address matches the customer's address, determining whether an image of the mailpiece matches any one of the plurality of images of sample mailpieces stored in the database;
a second bin configured to receive the mailpiece for electronic bill presentment when:
the mailpiece includes the identification code; or
when the recipient address matches the customer's address and the mailpiece matches one of the plurality of images of sample mailpieces; and
a third bin, different from the second bin, configured to receive the mailpiece for normal processing when:
the mailpiece does not include the identification code, and the recipient address does not match the customer's address; or
the mailpiece does not include the identification code, the recipient address matches the customer's address, and the image of the mailpiece does not match one of the plurality of images of sample mailpieces.

13. The system of claim 12, wherein the scanner comprises at least one of a form recognition scanner, optical character recognition scanner, and a radio frequency scanner.

14. The system of claim 12, wherein the processor includes a database configured to store the registration information.

15. A non-transitory computer-readable medium storing program instructions, which, when executed by a processor, cause the processor to perform a method for sorting for electronic bill presentment, the method comprising:
receiving registration information from a customer including customer identification information and biller information, wherein the biller information comprises a sample mailpiece of a biller and the customer identification information comprises the customer's address;
assigning an identification code to the customer that identifies an item for electronic bill presentment;
storing the registration information and the associated biller information in a database;
imaging the sample mailpiece of the biller;
storing the image of the sample mailpiece as one of a plurality of images of sample mailpieces in the database;
intercepting a mailpiece addressed to the customer on route to the customer from the biller;
determining, by a computer, whether the mailpiece includes the identification code;
sorting, by the computer, the mailpiece for electronic bill presentment when the mailpiece includes the identification code;
determining, by the computer when the mailpiece does not include the identification code, whether an address on the mailpiece matches the customer's address and, when the address on the mailpiece matches the customer's address, whether an image of the mailpiece matches any one of the plurality of the images of sample mailpieces stored in the database;
sorting, by the computer when the mailpiece does not include the identification code, the mailpiece for electronic bill presentment when the address on the mailpiece matches the customer's address and the mailpiece matches one of the plurality of images of sample mailpieces; and sorting, by the computer when the mailpiece does not include the identification code, the mailpiece for normal mail handling when the address on the mailpiece does not match the customer's address or the mailpiece does not match any one of the plurality of images of sample mailpieces.

* * * * *